(12) United States Patent
Ferries et al.

(10) Patent No.: US 8,732,219 B1
(45) Date of Patent: May 20, 2014

(54) METHOD AND SYSTEM FOR DETERMINING CORRELATED GEOGRAPHIC AREAS

(75) Inventors: John Robert Thomas Ferries, Boerne, TX (US); Barrington R. Young, Austin, TX (US); Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 177 days.

(21) Appl. No.: 13/215,022

(22) Filed: Aug. 22, 2011

Related U.S. Application Data

(60) Provisional application No. 61/376,975, filed on Aug. 25, 2010.

(51) Int. Cl.
*G06F 17/30* (2006.01)

(52) U.S. Cl.
USPC ............. 707/825; 707/723; 707/E17.01

(58) Field of Classification Search
None
See application file for complete search history.

(56) References Cited

U.S. PATENT DOCUMENTS

| | | | | |
|---|---|---|---|---|
| 6,253,214 B1 * | 6/2001 | Hall et al. | ............ | 707/667 |
| 6,330,572 B1 * | 12/2001 | Sitka | ............ | 707/608 |
| 7,680,859 B2 | 3/2010 | Schiller | | |
| 2002/0038280 A1 | 3/2002 | Levy | | |
| 2003/0101074 A1 | 5/2003 | Suzuki et al. | | |
| 2003/0229649 A1 | 12/2003 | Herrero | | |
| 2006/0095470 A1 * | 5/2006 | Cochran et al. | ............ | 707/104.1 |
| 2007/0011718 A1 * | 1/2007 | Nee, Jr. | ............ | 725/135 |
| 2007/0218900 A1 | 9/2007 | Abhyanker | | |
| 2008/0120363 A1 | 5/2008 | Loveland | | |
| 2009/0013011 A1 * | 1/2009 | Barker et al. | ............ | 707/203 |
| 2009/0048938 A1 | 2/2009 | Dupray | | |
| 2009/0089149 A1 * | 4/2009 | Lerner et al. | ............ | 705/10 |
| 2010/0082362 A1 | 4/2010 | Salsbury et al. | | |
| 2010/0100835 A1 * | 4/2010 | Klaric et al. | ............ | 715/765 |
| 2011/0125712 A1 * | 5/2011 | Kaila et al. | ............ | 707/626 |

OTHER PUBLICATIONS

"Rate My Neighborhood—Get Neighborhood Ratings Instantly", retrieved on May 17, 2010 from the internet <http://ratemyneighborhood.net/>, Copyright 2010, RateMyNeighborhood.net, 1 page.
"Find Best Matches to Any Neighborhood" retrieved from the internet URL:http://neighborhoodscout.com on Jun. 28, 2013, 2 pages.

* cited by examiner

*Primary Examiner* — Anteneh Girma
(74) *Attorney, Agent, or Firm* — Kilpatrick Townsend & Stockton LLP

(57) ABSTRACT

A method of determining a geographic area having similar characteristics to a first geographic area associated with a user includes receiving a plurality of inputs related to characteristics of a plurality of geographic areas and constructing a feature vector for each of the geographic areas based on the plurality of inputs. The method also includes receiving a plurality of inputs related to characteristics of the first geographic area and constructing a feature vector for the first geographic area associated with the user. The method further includes receiving an input from the user related to a city of interest, comparing the feature vector for the first geographic area to feature vectors associated with geographic areas located in or adjacent to the city of interest, and ranking the geographic areas located in or adjacent to the city of interest using the comparing step.

14 Claims, 11 Drawing Sheets

METHOD AND SYSTEM FOR DETERMINING CORRELATED GEOGRAPHIC AREAS

CROSS-REFERENCES TO RELATED APPLICATIONS

This application claims priority to U.S. Provisional Patent Application No. 61/376,975, filed on Aug. 25, 2010, entitled "Method and System for Determining Correlated Geographic Areas," the disclosure of which is hereby incorporated by reference in its entirety for all purposes.

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers is now expected.

SUMMARY OF THE INVENTION

The present invention relates generally to real estate systems. More specifically, the present invention relates to methods and systems for providing information related to correlations between neighborhoods. Merely by way of example, the invention has been applied to a method of providing a user with information on neighborhoods comparable to the user's current, past, or desired neighborhood. The methods and techniques can be applied to a variety of real estate, insurance, and financing systems.

According to an embodiment of the present invention, a method provides determining a geographic area having similar characteristics to a first geographic area associated with a user. The method includes receiving a plurality of inputs related to characteristics of a plurality of geographic areas, and constructing a feature vector for each of the plurality of geographic areas based on the plurality of inputs. The method also includes receiving a plurality of inputs related to characteristics of the first geographic area and constructing a feature vector for the first geographic area. The method further includes receiving an input from the user related to a city of interest, comparing the feature vector for the first geographic area to feature vectors associated with geographic areas located in or adjacent to the city of interest, and ranking the geographic areas located in or adjacent to the city of interest using the comparing step.

According to another embodiment, a method of suggesting a new neighborhood to a user based on a current neighborhood is provided. The method includes computing a current feature vector for the current neighborhood, wherein the current feature vector is based on a plurality of characteristics of the current neighborhood. The method also includes receiving an input from the user related to a city of interest and retrieving a plurality of feature vectors from a database storing feature vectors associated with neighborhoods in the city of interest. The method further includes comparing the current feature vector with each of the plurality of feature vectors and determining a neighborhood in the city of interest defined by a minimum distance between the current feature vector and one of the plurality of feature vectors. In some embodiments, a method further includes ranking the neighborhoods in the city of interest by increasing distance between the feature vector for the current neighborhood and the plurality of feature vectors.

According to yet another embodiment, a method provides comparing a current neighborhood to a desired neighborhood in a city of interest selected by a user. The method includes computing a current feature vector based on characteristics associated with the current neighborhood. The method also includes receiving the selection of the city of interest from the user, and accessing a plurality of feature vectors from a database, wherein each of the plurality of feature vectors is associated with one of the plurality of neighborhoods in the city of interest. The method further includes determining a plurality of neighborhoods in the city of interest characterized by a minimum difference between the current feature vector and each of the plurality of feature vectors. In addition, the method may include displaying the plurality of neighborhoods to the user and receiving a selection of a desired neighborhood from the user. After receiving the selection, the method includes computing a difference between the current feature vector and the feature vector associated with the desired neighborhood and displaying the difference to the user. In some embodiments, displaying the difference comprises displaying a cost differential between a similar home in the current neighborhood and the desired neighborhood. In other embodiments, the characteristics associated with the current neighborhood include characteristics associated with the user.

According to yet another embodiment, a method provides a user with a neighborhood ranking. The method includes receiving an identification of a city including a plurality of neighborhoods, receiving a listing of homes located in the city, and parsing the listings into subsets of listings, each subset associated with one neighborhood. The method also includes computing, using a processor, a feature vector for the homes in each subset of listings, and for each neighborhood, forming a neighborhood feature vector by combining the feature vectors for the homes in each subset of listings. The method further includes computing a current feature vector associated with a current home of the user, comparing the current feature vector with the neighborhood feature vectors for each neighborhood, ranking the neighborhoods using the comparison, and providing the user with the ranking.

In embodiments described above, an indication of the city may be received as an input from the user through a graphical user interface. In a particular embodiment, the current feature vector is a function of attributes associated with the current home. In another particular embodiment, the method may further include adjusting the current feature vector using user input prior to comparing the current feature vector with the neighborhood feature vectors for each neighborhood. Also, the current feature vector may include an N-dimensional vector based on N attributes associated with the current home.

According to yet another embodiment, a method provides suggesting a new neighborhood to a user using information related to the user's previous neighborhoods. The method includes computing a timeline feature vector for each of the user's previous neighborhoods, each of the user's previous neighborhoods having a plurality of characteristics associated therewith, wherein the timeline feature vector is calculated using the plurality of characteristics associated with each of the user's previous neighborhoods. The method also includes determining a combination timeline feature vector using one or more of the timeline feature vectors, wherein the combination timeline feature vector is predictive of the user's preference for the new neighborhood using the information related to the user's previous neighborhoods. The method further includes receiving an input from the user related to a city of interest, retrieving a plurality of feature vectors from a database storing feature vectors associated with neighborhoods located in or adjacent to the city of interest, and comparing the combination timeline feature vector with each of the plurality of feature vectors. Additionally, the method includes determining one or more of the neighborhoods located in or adjacent to the city of interest defined by a minimum distance between the combination timeline feature vector and one of the plurality of feature vectors.

According to yet another embodiment, a method provides suggesting a new neighborhood to a user. The method includes computing a current feature vector for a current neighborhood in or adjacent to a current city, wherein the current feature vector is calculated using a plurality of characteristics of the current neighborhood and wherein the current neighborhood has a selected characteristic and the current city has a corresponding selected characteristic. The method also includes calculating a first percent difference between a mean value of the selected characteristic associated the current neighborhood and a mean value of the corresponding selected characteristic associated with the current city. The method further includes receiving an input from the user related to a city of interest, retrieving a plurality of feature vectors from a database storing feature vectors associated with neighborhoods located in or adjacent to the city of interest, wherein each of the neighborhoods has the selected characteristic and the city of interest has the corresponding selected characteristic. Then the current feature vector is compared with each of the plurality of feature vectors. Also, the method includes calculating a second percent difference between a mean value of the selected characteristic associated each of the neighborhoods located in or adjacent to the city of interest and a mean value of the corresponding selected characteristic associated with the city of interest. The method then determines one or more of the neighborhoods located in or adjacent to the city of interest characterized by: a minimum difference between the current feature vector and each of the plurality of feature vectors; and the first percent difference being similar to the second percent difference.

Numerous benefits are achieved by way of the present invention over conventional techniques. For example, embodiments of the present invention provide methods and systems for suggesting new neighborhoods to a user based on a variety of inputs including a current neighborhood, a listing of desired neighborhood attributes or characteristics, characteristics associated with a user's current home, a listing of desired home attributes or characteristics, combinations thereof, or the like. As described more fully throughout the present specification, embodiments of the present invention utilize feature vectors to characterize homes, neighborhoods, geographic areas, and/or cities. Utilizing feature vectors, which can be adjusted based on user input or by other techniques, these entities can be compared to each other and ranked with respect to each other. Additionally, embodiments of the present invention utilize user inputs and cloud-based sources as inputs to the neighborhood comparison and ranking process, enabling improved results compared with conventional techniques. These and other embodiments of the invention along with many of its advantages and features are described in more detail in conjunction with the text below and attached figures.

DETAILED DESCRIPTION OF SPECIFIC EMBODIMENTS

Figure 1:
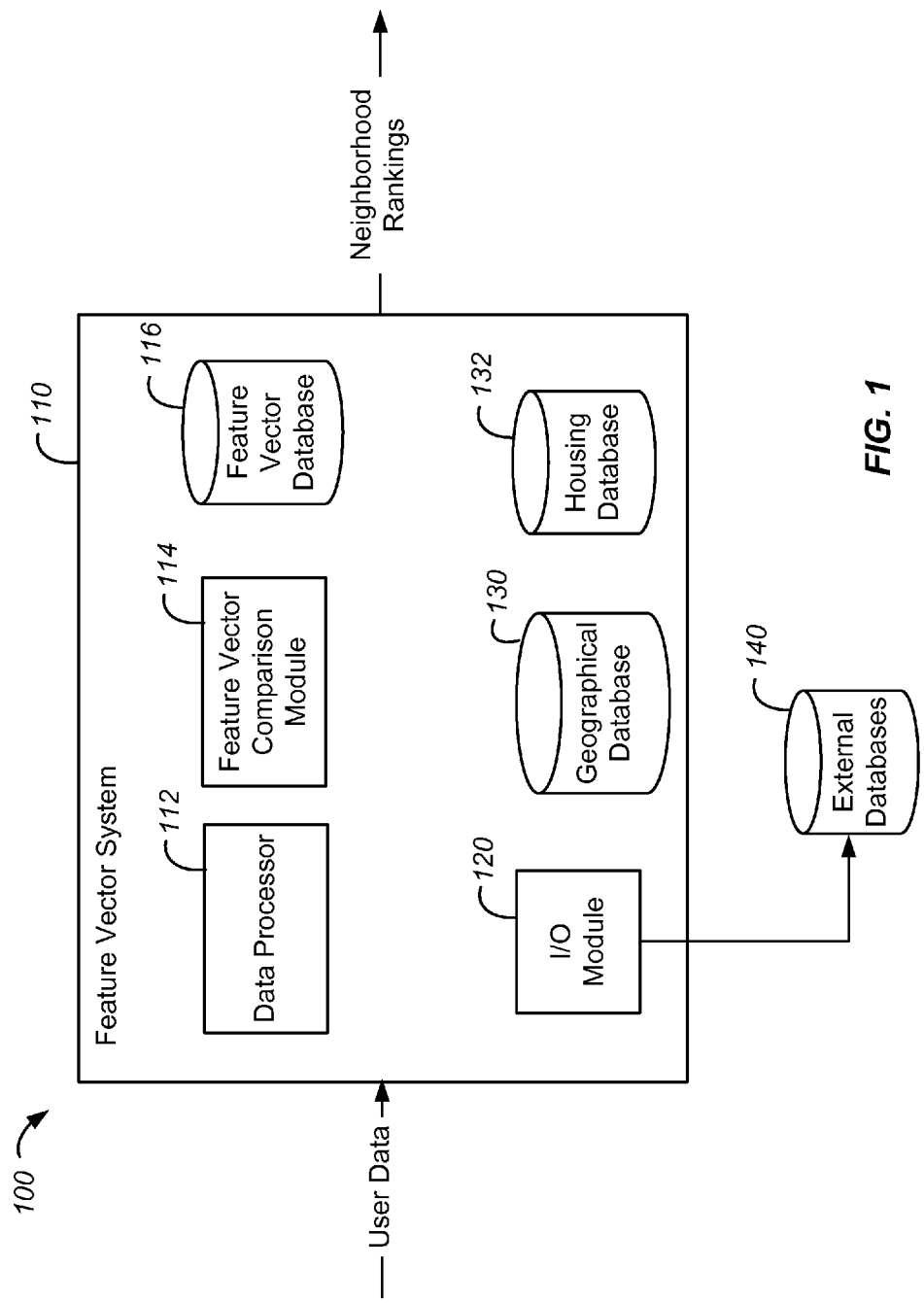
FIG. 1 is a high level block diagram of an apparatus for processing and using feature vectors for homes and/or neighborhoods according to an embodiment of the present invention.

Embodiments of the present invention relate to technologies to facilitate homeowners and/or renters in finding, acquiring, insuring, and/or maintaining real property. Technologies related to embodiments of the present invention support a homeowner/renter, for example, a member of the present assignee, with the initial preparation associated with the purchase of a home and/or rental of a home/apartment. Such initial preparation can include advice and counseling related to a person's ability to afford a home or apartment, development of a financial plan to facilitate the acquisition, web-enabled self-service systems (e.g., home purchase calculators) used to determine financial goals and requirements, and/or on-line member communities related to homeownership and/or rental.

After a person completes initial preparation, technologies related to embodiments of the present invention assist the person in finding suitable properties through the use of rent/buy listings including information tailored to each person's interests and background. For example, preapproval of the person for mortgage rates and/or homeowner's/renter's insurance can be used to provide rich information content as part of the search process. On-line member communities can be used to assist users in finding property that is suitable for the particular user's interests and income.

Additionally, technologies related to embodiments of the present invention provide for assistance in the purchase/rental transaction, including obtaining a mortgage and provision of assistance in negotiating the purchase or lease. Protection of the newly acquired home or rented property is also related to embodiments of the present invention, in one of several forms including homeowner's insurance, mortgage life insurance, renter's insurance, flood insurance, personal property insurance, home security systems, home warranties, and the like.

Moreover, technologies related to embodiments of the present invention provide a person with assistance in moving to, maintaining and/or renovating, and/or refinancing the newly purchased or rented property. Thus, embodiments of the present invention relate to technologies that provide a one-stop home resource for delivering home solutions related to buying, selling, renting, and/or owning real property. In particular embodiments, members of a membership organization (e.g., an insurance company, a financial institution, real estate company, or the like) utilize the methods and systems described herein to manage their real property interests and interact with other community members to enable new concepts related to homes and other real property.

Realtors have information of use to home purchasers, including information available through the Multiple Listing Service (MLS). Advances in information sources are reducing the information barrier associated with real estate information. A characteristic of real estate transactions is the complicated nature of the transactions involved. Thus, many real estate purchasers feel they benefit from assistance provided by realtors. Some systems implemented by the present assignee assist home purchasers and sellers in navigating the offer/acceptance phase of the real estate transaction.

Embodiments of the present invention provide systems that enable a home purchaser to obtain information related to neighborhoods of interest. Typically, a user interested in moving to San Antonio, Tex. who possesses little information about the San Antonio area, will enter a zip code or a city name into a real estate search engine to obtain a listing of homes for sale in the San Antonio area. Because of the lack of information available to the user, this search process is typically tedious and inefficient. Embodiments of the present invention obtain information related to the user and information related to the area of interest and generate neighborhoods of interest to the user. In an exemplary embodiment, demographic data related to a first area known to the user, for example, demographic data on schools, geohazards, cost of living, tax rates, traffic, proximity to banks, crime rates, police services, fire services, proximity to grocery stores, proximity to hospitals, proximity to sex offenders, and the like is analyzed to determine the user's neighborhood profile. This neighborhood profile can be related to a profile for a neighborhood in which the user has lived in or liked in the past, the neighborhood the user currently lives in, or the like.

If the user is living in a first city and is moving to a second city, the system can analyze information related to neighborhoods in the first city and generate neighborhoods in the second city that may be of interest to the user. For example, the system can analyze physical characteristics of the first city, such as house values, school district ratings, crime statistics, 3G connectivity or other wireless services, access to highways, amenities, distance from the downtown core area, and the like, and can determine similar neighborhoods in or near the second city. In addition to neighborhood characteristics, characteristics of homes can be included in the analysis, for example, number of bedrooms, home improvements, insurance rates, and the like. Moreover, characteristics of people living in the neighborhood (e.g., people demographics) may be utilized, including income level, median income, jobs, consumption patterns, utility patterns, number of cars per home, move frequency, military status, age/income/etc. of dependent children and/or spouse, environmental consciousness, and the like. The user may prefer to live in a new neighborhood where people with similar people demographics as the current or past neighborhoods. Thus, by using the information related to the first city, a system in accordance with the present invention can generate neighborhoods in the second city for the user with similar physical characteristics and people demographics as the first city.

As an example, a user typically begins a search of the MLS based on a city, an address, or an MLS number. Entering a city can result in a large and unmanageable number of listings. An address may not be known based on the user's lack of knowledge of the new city. It is unlikely that the user will know the MLS number of a particular property. In order to assist the user in finding neighborhoods of interest and thereby homes of interest, embodiments of the present invention can use a person's current location, for example, obtained from a mobile device with location information, as a starting point for the home search.

The neighborhood like mine functionality provided by embodiments of the present invention provides an initial telescoping of a search based on information about a current city and/or information about the user, which can be matched to determine neighborhoods of interest. According to embodiments of the present invention, information can be stored in a database or received from the user, including information related to a previous neighborhood in which the user has lived. A previous neighborhood includes any neighborhood in which the user has lived, including past and current neighborhoods. As an example, previous addresses may be maintained by a membership organization, may be obtained from a credit report, may be obtained based on data entry by the user, or the like. Embodiments of the present invention obtain data related to the previous city, as well as the city to which the user is intending to move. The data is analyzed to form a metric (e.g., a vector) for the previous city as well as neighborhoods in the future city. The system is then able to suggest a neighborhood of interest to the user. In one embodiment, the system provides information to the user related to the difference between two neighborhoods, for example, that median income for the new neighborhood is $5,000 less than the previous neighborhood, and the like. Based on the suggested neighborhood, the user is able to perform a search for a particular home much more efficiently.

In an embodiment, the user can enter several previous addresses at which they have lived in chronological order and optionally prioritize the addresses. In other embodiments, a single address is entered. In other embodiments, the addresses are automatically filled from a database including information on the user.

FIG. 1 is a high level block diagram of an apparatus 100 for processing and using feature vectors for homes and/or neighborhoods according to an embodiment of the present invention. As used herein, a feature vector is an n-dimensional vector of numerical features that can represent characteristics of homes and/or neighborhoods. When representing characteristics of neighborhoods, the feature values may correspond to various numeric values, such as house values, crime rate, school district ratings, distance to parks, distance to other amenities, or the like. Using a feature transform, the neighborhood or home characteristics are mapped onto a feature vector in an appropriate multidimensional feature space. A good quality feature vector can be formed by appropriate analysis and selection of data to determine the makeup of each of the cells in the vector. The analysis may include examining clustering of data. In some embodiments, a dendrogram may be created using clustering, and various clusters can be selected and targeted to build a feature vector. In embodiments of the present invention, the similarity of two neighborhoods can be defined by the proximity of their feature vectors in the feature space. The closer their feature vectors are located in the vector space, the more likely the two neighborhoods associated with the feature vectors will be similar to each other.

As illustrated in FIG. 1, user data is received as an input and neighborhood rankings are provided as an output in an embodiment of the present invention. Referring to FIG. 1, the feature vector system 110 includes a data processor 112 operable to compute and adjust feature vectors, a feature vector comparison module 114, and a feature vector database 116. The feature vector processor 110 also includes an input/output module 120, a geographical database 130, and a housing database 132. External databases 140 are accessible to the feature vector processor 110 and are utilized in some embodiments.

A number of different types of user data may be received by the feature vector system 110. The user data received as an input may include a new geographical area (e.g., metropolitan area, city, zip code, subdivision, school district or the like) to which the user is interested in moving. Other user input may include the user's preferences related to various characteristics of neighborhoods or homes (e.g., proximity to work, proximity to school, school ranking, or the like). The user data may also include personal data or financial data of the user. Alternatively or additionally, some of the user data may be automatically populated by other systems associated with feature vector system. As described fully through the present specification, the input/output module 120, the data processor 112, feature vector comparison module 114, feature vector database 116, geographical database 30, housing database 132, and external database 140 are utilized to receive inputs from a user operating user a computer and determine neighborhood rankings in a new geographical area. In addition to providing neighborhood rankings, the feature vector system can also provide ranking of individual homes within a new neighborhood that best match the user's preference.

The external databases 140 may include a variety of third party data sources which may be publicly available or proprietary data which may be commercially available. For example, the external databases may include census data including average household income, average household number and size, diversity of population related to age, ethnicity, race, or the like. Also, property tax information, neighborhood association fee, home appraisal values of homes in a neighborhood, or the like may be stored in external databases and can be used for computing a feature vector associated with a neighborhood. Proprietary data may include information related to people who lived in particular houses, property ownership history, spending habits of people in the neighborhood, and the like.

Although external databases 140 are illustrated in FIG. 1, this is not required by embodiments of the present invention. In some embodiments, information necessary for feature vector analysis and/or neighborhood ranking is maintained internally within the feature vector system 110. In some embodiments, data from both internal and external sources is integrated to provide the system operator with data that is both useful and low in cost, however, this is not required by the present invention.

Figure 2:
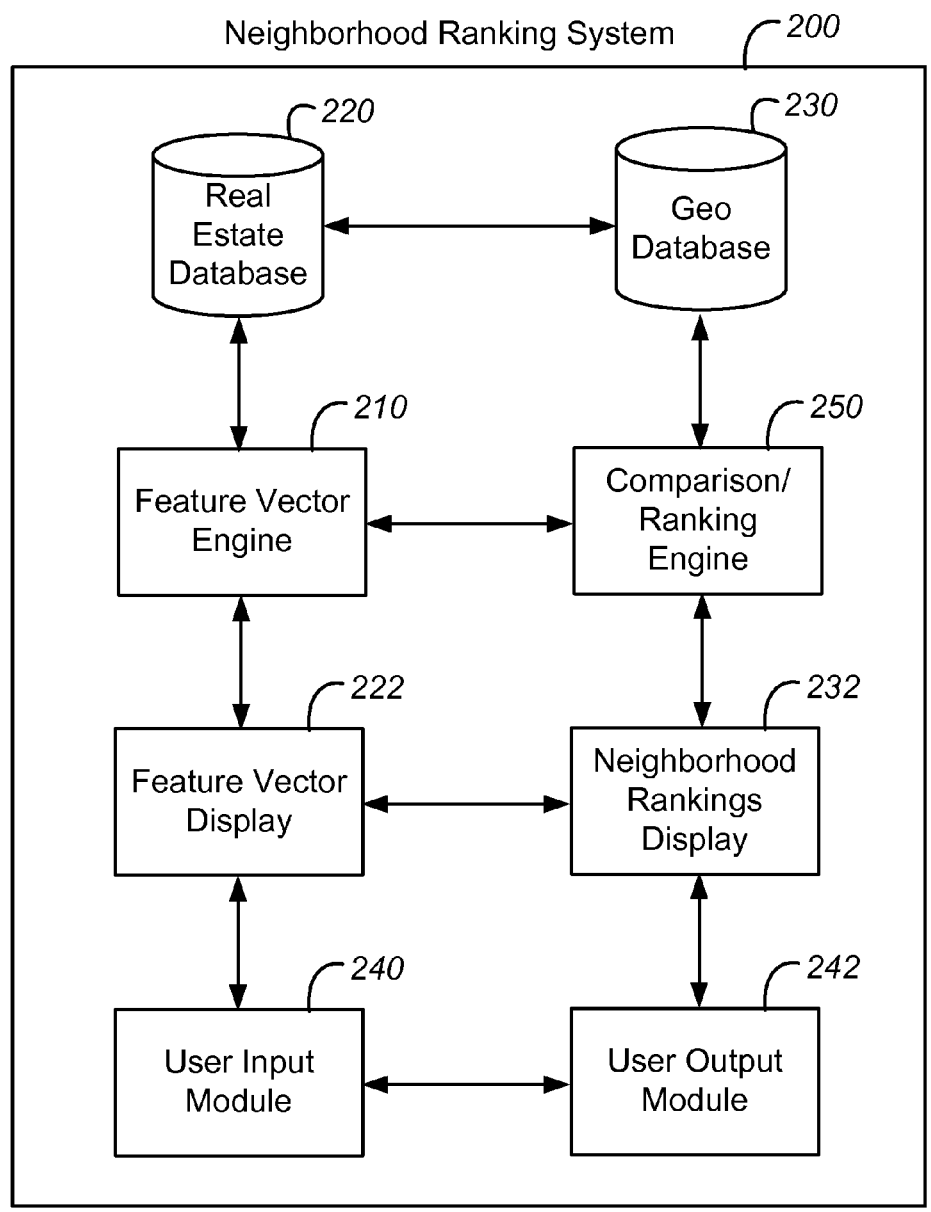
FIG. 2 is a high level schematic diagram illustrating a neighborhood ranking system according to an embodiment of the present invention.

FIG. 2 is a high level schematic diagram illustrating a neighborhood ranking system according to an embodiment of the present invention. The neighborhood ranking system 200 includes a feature vector engine 210 operable to compute, adjust, and store feature vectors. The feature vectors may be stored in the real estate database 220 or the geographical information database 230. The neighborhood ranking system 200 also includes a comparison/ranking engine 250 that can compare feature vectors for various geographic areas and rank the geographic areas using the comparisons. A feature vector display 222 and a neighborhood rankings display 232 are provided and interact with a user input module 240 and a user output module 242 to provide for input/output functionality. In an embodiment, the user input and output are provided through one or more web pages accessed through the Internet.

The user is able to enter information used by the neighborhood ranking system, for example, by the feature vector engine 210. As described more fully in relation to FIG. 3 below, the feature vector engine 210 receives information about the user's current neighborhood, past neighborhood, or notional neighborhood desired by the user. The feature vector engine 210 may also receive information about particular features of an individual home currently owned or desired by the user, and the like. The feature vector engine 210 further receives input related to a new geographical area of interest. Additionally or alternatively, the comparison/ranking engine may receive user input related to a new geographical area of interest. Based on characteristics of neighborhoods (or homes), a feature vector associated with each neighborhood can be performed by the feature vector engine 210. Information related to each neighborhood, represented by a feature vector, can be presented to the user using feature vector display 222.

Information used by the comparison/ranking engine 250 may be provided by the user using the user input module 240 or may be provided as a result of feature vector analysis performed by the feature vector engine 210. As described in relation to FIG. 3, feature vectors associated with one or more neighborhoods in a new geographical area may be retrieved from a database and may be compared with a feature vector selected by the user or the system (e.g., a feature vector associated with the user's current neighborhood or a notional neighborhood desired by a user). A distance between each of the feature vectors associated with new neighborhoods is compared with the selected feature vector. The neighborhoods in the new city or geographical area of interest can be ranked according to the distance between each of the feature vectors associated with new neighborhoods and the selected feature vector. The neighborhood comparison and ranking of the new neighborhoods is displayed using the neighborhood rankings display 232.

Thus, embodiments of the present invention provide functionality not available using conventional neighborhood or home search systems. Embodiments of the present invention utilize feature vectors to characterize homes, neighborhoods, geographic areas, cities, or demographics in different areas. Utilizing feature vectors, which can adjusted based on user input or by other techniques, any number of characteristics associated with these entities can be compared to each other and ranked with respect to each other. In addition, since characteristics associated with these entities can be weighted according to their importance to the user, the search results will better reflect the preference of the user.

Embodiments of the present invention can be categorized into at least four facets of the neighborhood or home search process. Each facet can have variations. The first facet is to show the user neighborhoods that are like ones that the user likes, typically expressed by a set of criteria for things that the user likes (i.e., a notional neighborhood). The user has not lived in this notional neighborhood, but knows their preferences and the kind of neighborhood they prefer. The criteria or preferences can include living in close proximity to a location, for example, school, work, shopping, and the like.

The second facet is based on neighborhoods like the one that the user lives in now. Attributes that define the current neighborhood can be used as inferred attributes based on demographics and/or expressed attributes similar to the preferences discussed in relation to the first facet.

The third facet is based on neighborhoods like the one that the user used to live in, where this history may be stored in a database maintained by the system operator or may be obtained from other sources. The demographic information for the previous neighborhoods can be used and combined with 1 to N criteria expressed by the user, for example, proximity of churches, proximity of schools, and the like. In some embodiments, a series of homes are included in the analysis so that a trend can be developed for the user and the neighborhood suggestions utilize this trend in determining neighborhoods of interest to the user.

The trend developed for future neighborhood suggestions may depend on characteristics of the user's previous neighborhoods as well as the user's personal data and financial data. Depending on the user's age and family status, some aspects of a suggested future neighborhood may be different from the previous neighborhoods. As an example, if the user is about to become an empty nester with children leaving for college, then certain attributes of a suggested future neighborhood, such as school district ratings or average home size, may be different from corresponding attributes in the previous neighborhoods. In another example, if the user's financial data over time reflects that the user's income has been increasing at a steady rate, then the user's financial data may be taken into account in determining affordability homes in a suggested future neighborhood. The user's personal data and/or financial data can be incorporated as part of vector analysis to compute a feature vector associated with a future neighborhood for the user.

The fourth facet is based on neighborhoods that people like the user like. In this embodiment, a demographic overlap between the user and the demographics of the people living in the neighborhoods is used to suggest a neighborhood including people with a similar demographic profile to the user. The demographic information can include behavioral aspects (e.g., the user has a checking account and owns a '76 Buick Regal) and personal information (e.g., the user is 26 years old, gender, ethnicity race, or the like). The demographic information can also include people's income, political association, family status, or the like. The system is able to systematically infer that there are other similar people in a particular neighborhood and suggest such a neighborhood. As an example, if a user, seeking for a suitable neighborhood in a new city, has a family with young children, then the system can suggest a neighborhood in a new city where people with a similar family profile live in.

As an alternative to suggesting a neighborhood with homes for sale, the system could recommend that the user rent a home/apartment. For example, if the user is a 26 year old young professional moving to Chicago, the system could recommend that the user rent rather than buy a house, since most of the people in the user's situation don't buy houses. The system could then recommend rental properties in neighborhoods of interest that match one or more of the facets discussed above.

Embodiments of the present invention can apply customer segmentation approaches to neighborhood segmentation. Neighborhood segments can be defined based on characteristics of the people in the neighborhood. Neighborhoods in the user's city of interest can be divided into different segments using a suitable segmentation technique. For example, the neighborhood segmentation process can include dividing the entire city based on characteristics of people living in each neighborhood segment (e.g., income, age, family status, or the like). Once neighborhood segments are defined, a correlation between a person's segment and the neighborhood segment can be used in suggesting neighborhoods of interest.

Data used in performing the neighborhood segmentations can be provided by users based on social media or other suitable techniques. A person living in a neighborhood could provide data inputs used by the system described herein. Thus, the system provides an input portal through which a user can enter information on a particular neighborhood including likes and dislikes associated with the neighborhood (e.g., I like the schools, I don't like the fact that it is so far from the airport or so far from shopping, I really like the proximity to parks, etc.). The preferences could be ranked on a scale, for example, from one to ten, and as the amount of user entered data increases, demographic information can be combined with user-generated information such as that from social media sites to improve the quality of the vectors associated with a particular neighborhood. As an example, an embodiment of the present invention utilizes a vector-based approach in which the information on the user is vectorized in an N-dimensional space and the information on the neighborhood is vectorized in an M-dimensional space in order to compare the vectorized information. In a particular embodiment, N=M. The vectors can be thought of as a DNA vector built for either the user, a home(s), or neighborhood(s). The comparison process includes finding vectors that match most closely, differ by less than a predetermined percentage, or the like.

Other embodiments utilize both conventional neighborhood definitions and/or neighborhood definitions that will have non-standard geographic boundaries based on the people living in the neighborhood. As an example, a neighborhood could be defined by a set of Zip+4 zip codes, by city, or the like. The neighborhoods could also be defined by demographics.

In an embodiment of the present invention, a neighborhood boundary can be defined by the user input. The user can geo-fence geographic areas of interest to the user. For example, the user's computing device can display a map of a city or a metropolitan area that the user is interested or display a map of an area that the user is currently geo-located by the user's mobile computing device. On a display screen, the user can draw freehand a boundary around geographical areas with features that the user like with a pointing device. A boundary geo-fenced by the user can be regarded as a neighborhood for the purpose of computing a feature vector for the geographic area, even if it includes a geographic area larger than what is typically regarded as a conventional neighborhood. In some embodiments, the user can geo-fence around non-contiguous areas on the map and define them as a single neighborhood to compute a feature vector associated with a neighborhood geo-fenced by the user. For example, the user can geo-fence around a portion of one conventional neighborhood and combine it with a portion of another conventional neighborhood. Thus, neighborhoods can be user defined or defined by a feature vector system according to embodiments of the present invention.

In another embodiment of the present invention, the user's geo-location may be used to compute a feature vector for a neighborhood around the user's current geo-location. The user may serendipitously uncover a geographic area with many features that appeal to the user. Although the user has no intention of moving to this particular neighborhood, the user may desire to find a neighborhood in a different city which has characteristics similar to the neighborhood that the user serendipitously stumbled upon. In an embodiment of the present invention, the user may be geo-located by the user's mobile device, and a map of geographic areas around the user's geo-location may be displayed on the screen of a mobile computing device. A mobile application on the user's mobile computing device may provide an interactive graphical user interface for user input. For example, the user may draw a boundary on a map shown on the display screen, geo-fencing specific streets, subdivisions, or the like and define the geographic area within the boundary as a neighborhood. The user may also provide free text input with respect to features of the neighborhood that appeal to the user. Based on the user input and third party information (e.g., demographic profiles, home price, crime rate, and the like), a feature vector of the neighborhood around the user's current location can be calculated and saved in a database for comparison with other feature vectors.

In yet another embodiment of the present invention, a mobile computing device may have an application software that links the person's current location with a search engine for homes in an nearby neighborhood. When a user passes by a new geographic area and finds a neighborhood with characteristics that the user like, then the user can geo-locate the user's position with the user's mobile computing device (e.g., a mobile phone). The user can use a mobile application operated by an entity (e.g., a real estate company, a financial institution, or an insurance company, or the like) to view a map of a neighborhood on a graphical user display, including street names and landmarks, at which the user is geo-located. The mobile application may also provide a link on the graphical user display so that the user can review information about the neighborhood provided by third parties. The mobile application may also provide a search function for the user to initiate a search for homes available for sale or for rent in the neighborhood.

Figure 3:
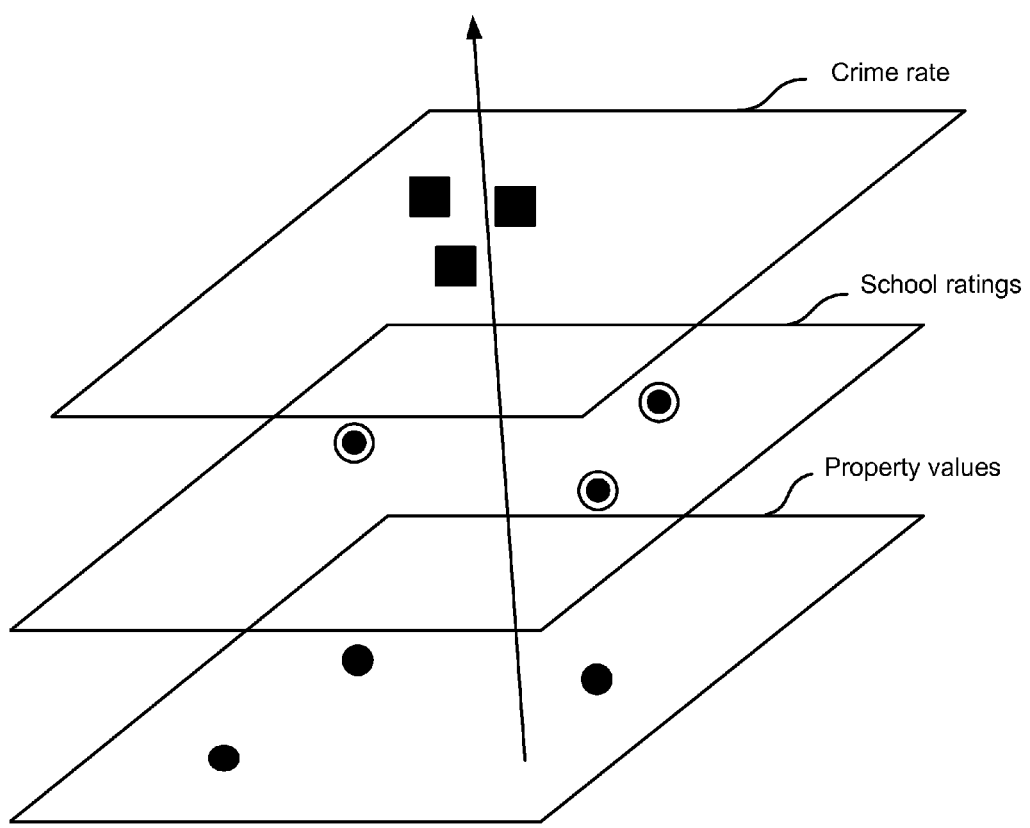
FIG. 3 is a high level schematic diagram illustrating characteristics used in computing feature vectors according to an embodiment of the present invention.

FIG. 3 is a high level schematic diagram illustrating characteristics used in computing feature vectors according to an embodiment of the present invention. As illustrated in FIG. 3, data or characteristics related to an entity are shown in various groups. As an example, attributes associated with a neighborhood are illustrated: property values, schools, and crime. These attributes are merely exemplary. Data for each attribute is illustrated as points lying in the attribute plane (i.e., dots for property values, dots in circles for schools, and squares for crime). Based on these data points, a feature vector 310 can be computed for the exemplary neighborhood. Although the property values and school quality are somewhat spread out, the crime data is tightly clumped, for example, illustrating that this particular neighborhood is characterized by low crime.

Some embodiments of the present invention adjust for differences in the cost of living in different areas. As an example, in a low cost of living area, a 5-bedroom house can be purchased for $300,000, but in a high cost of living area, a 1-bedroom condominium can be purchased for $300,000. The system can consider cost of living differences including taxes at the city and state level, and the like.

Figure 4:
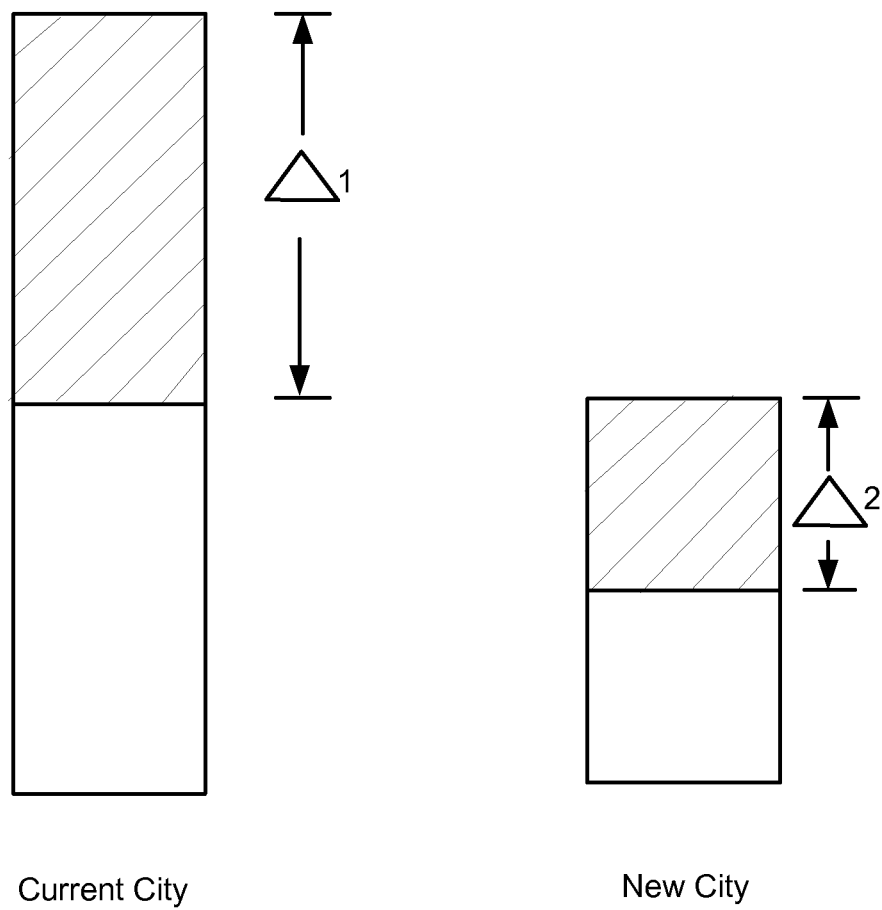
FIG. 4 is a high level schematic diagram illustrating feature vector comparisons between a current city and a new city according to an embodiment of the present invention.

FIG. 4 is a high level schematic diagram illustrating feature vector comparisons between a current city and a new city according to an embodiment of the present invention. In FIG. 4, a feature vector for a current city illustrates that the median neighborhood has a property value in a first range ($M_1$) and a user's neighborhood is above the median, with a spread of $\Delta_1$.

In a new city, with a lower cost of living, the median neighborhood has a property value in a reduced range ($M_2$), with a spread of $\Delta_2$.

Embodiments of the present invention integrate the search functionality described herein with the user's personal financial situation, which can be identified using personal financial management (PFM) software. PFM software can aggregate all your financial data, provide the ability to budget, the ability to plan, the ability to set goals for saving, and the like. The search results can be combined with the user's financial condition in order to further filter the search results that are applicable to the user's situation, for example, homes that are in the user's price range based on their financial condition.

According to an embodiment of the present invention, a user provides an address (e.g., an address of the user's current home) and a demographic analysis is performed in relation to the address. The demographic analysis can produce demographic information using the address, a neighborhood in which the address is located, a user-defined geographic area including the address, or the like. The embodiment also includes receiving an input of a new city. Demographic information related to the new city (e.g., demographic information related to neighborhoods in or adjacent to the city, homes in or in the vicinity of the city, etc.) is compared to the initial demographic information to predict a new neighborhood that is well correlated with the user's current home and/or neighborhood.

According to some embodiments of the present invention, the four facets discussed above can be combined, for example, use of the user's current address, a demographic analysis based on information stored about the user, and a set of criteria or preferences. As an example, a set of slider bars could be pre-populated with default values based on the user's current neighborhood. The user could then modify the slider bars to provide preference information (e.g., number of parks, quality of schools, access to the highway, access to the airport, and the like). In some situations, the user is moving to a completely different type of city (e.g., from a small town to New York City), and the analysis of the user's current neighborhood may not necessarily be useful in determining a type of neighborhood that the user desires in a city. The combination of an analysis of the current address or demographics and the express preferences of the user can be utilized to suggest potential neighborhoods of interest in the new city.

In other embodiments, a neighborhoods search with slider bars can produce results that are then combined with the PFM data on the user to predict whether or not the user can afford the homes returned in the search result. In some embodiments, using the user's PFM data, the affordability of the homes can be determined based on the user's monthly income or cash flow and combined expense, including a mortgage payment, insurance, association fee, home maintenance fee, or the like. If it is determined that the user cannot afford a home with features that are important to the user, then the system may suggest renting or may suggest a nearby city that is more affordable or has features that are better aligned with the user's preferences.

A membership organization implementing embodiments of the present invention can utilize information on other members in determining the vectors associated with the user and the neighborhoods. As an example, in a particular neighborhood, a separate vector can be computed for other members living in that neighborhood. Additionally, this analysis could be performed on the neighborhood that the user is living in currently. Thus, the demographic data for the neighborhood could be supplemented by demographic data for members of the organization.

An additional source of data for a membership organization could be records on a particular property occupied by members as a function of time. A membership organization can include a company with a number of customers, for example, a bank with a state-wide or national footprint. As an example, if 123 Main Street was owned by a first member at a first time and a second member at a second, later time, the demographics of the neighborhood could be tracked as a function of time. Thus, a demographic profile of that house can be constructed based on the members that owned the house over time. For example, a house could be well suited for a junior officer who is a recent graduate of a service academy since several members fitting this profile have owned the home. The information could be weighted as a function of time to improve the relevance of the data. The information maintained by the membership organization can be supplemented with information from other sources, including information on insurance claims for a particular home. In addition to information on homes for sale, information on rental properties can be utilized as well.

In an embodiment of the present invention, information on the user can be obtained from several sources including behavioral information such as spending, income, family size, profession, work experience, and the like. This information can be paired with third party segmentation data that places people into a predetermined number of segments. In addition, user supplied data can be utilized. As an example, if a user is a dog owner, they could rate the neighborhood in respect to issues related to dog ownership. Accordingly, a user looking to move into that neighborhood would be able to use the user supplied data to enhance the search results. Social media inputs can be used by the users to provide user supplied data.

The ratings on the neighborhoods can be sorted based on the source of the data used in the analysis, for example, showing a user all the opinions on the neighborhood, or only opinions from people that actually live there or have lived there, or all opinions, even for people who chose not to live in that particular neighborhood. In another example, the source of data used in the analysis maybe limited to a social network of friends or experts whose opinions the user trusts, regardless of whether they actually live there or have not lived there. As members provide reviews of neighborhoods, the data can be aggregated or pooled and the words that were used in relation to a given neighborhood can be analyzed to determine neighborhood characteristics. Word analysis can be used to determine the neighborhood characteristics: good schools, churches, good traffic, and the like. If the user is currently living in a neighborhood that has neighborhood characteristics defined by the cloud of reviews, what people have said about the neighborhoods in the new city can be used in performing the neighborhood matching.

An alternative embodiment of this concept is a user entering a name of a neighborhood and the output being provided in the form of the word analysis (cloud analysis) that describes the way that people in the aggregate have characterized the neighborhood. Embodiments of the present invention enable the combination of structured data and unstructured data to provide neighborhood characterizations. As an example, for crime, structured data in the form of crime statistics are available and can be used to characterize a neighborhood as a low crime area. In addition to this structured data, data from the cloud can be used to supplement the structured data or in place of the structured data. If, for a particular neighborhood, significant discussion is related to the absence of crime, even though the word "crime" would appear frequently, access to the structured data would indicate that the neighborhood discussion of crime is actually a good thing, since the neighbors are discussing how little crime there is in the neighborhood.

A variety of data sources can be utilized with embodiments of the present invention including census, tax record information, which can provide information about the appraised value of the property, which, in turn, provides information about the cost of living in the neighborhood, and zoning information. Census data for a given property provides information about the number of people living in the house, their income, and the like, which is not available through tax records. The data would be useful, not only to potential buyers, but to renters as well. Other data fields associated with the census can also be used. The data discussed above can be overlaid with third party data that may be publicly available. First party proprietary data can include information, discussed above, on the people who lived in particular houses, property ownership history and the like.

In relation to zoning information on the house of interest, zoning information for adjacent homes could be utilized, for example, for a home that is zoned single-family but abuts multi-family zoned properties, the zoning information could be used to characterize the neighborhood. Thus, neighborhoods can be defined at smaller units than the conventional units utilized by the MLS, providing higher granularity than available using conventional approaches.

In some embodiments, a N-dimensional vector (also referred to as a feature vector) is computed that characterizes the user, the user's current home, and/or the user's current neighborhood based on the schools, the proximity to the highway, the parks close to the neighborhood, median income, number of children, and the like. Vectors can be created for neighborhoods or for individual houses. The definition of a neighborhood may be performed by creating N-dimensional vectors for each home in the area and when a predetermined number of homes have vectors matching the vector of the user/original neighborhood within a predetermined range, the neighborhood is defined based on the matching homes. In this sense, the analysis provides not only "neighborhoods like mine," but "houses like mine." In some search results, a predetermined number of "top hits" can be returned of houses with vectors matching the user/original neighborhood vector. One of ordinary skill in the art would recognize many variations, modifications, and alternatives.

Some embodiments define a neighborhood as a geographic polygon including houses with vectors matching the search vector. In some embodiments, the neighborhood vectors and the home vectors are inter-dependent. The neighborhoods defined by embodiments of the present invention can include a polygonal shape that can include one or more MLS neighborhoods, one or more school districts, or the like. For example, a neighborhood can be defined according to a school district, even if it spans across different slivers or non-contiguous areas using a geographic polygon. Since the neighborhoods can be defined based on the demographic data analysis or other techniques disclosed herein, the neighborhoods are not limited to conventional neighborhood definitions.

If homes are matched against the search vector, the search results will be returned in a form similar to an N-dimensional bell curve, with the most closely matched home at the peak of the bell curve. Homes that match less closely are positioned down the bell curve toward the wings. At a threshold level of dissimilarity, the neighborhood is defined. Thus, using a home as a starting point provides additional methods of defining neighborhoods, which may not include a contiguous geographic area. The static neighborhood definition can be modified into a neighborhood defined by vector similarity, not geographical boundaries.

Alternatively, the vector for the user/neighborhood could be computed. A database maintained by the system operator, for example, a membership organization, could then be accessed to determine one or more members with vectors closely matching the user/neighborhood vector. A N-dimensional bell curve would be created around the homes of the one or more members to define the neighborhood of interest.

In these embodiments, rather than characterizing neighborhoods based on MLS definitions, zip codes, or the like, other people with a vector similar to the user are found in order to determine neighborhoods of interest to the user. Other people with a vector similar to the user may include those who have a similar demographic profile, who searched or viewed the same neighborhood of which the user is interested. When the user's search results in a particular neighborhood, the system may also suggest additional neighborhoods that other people with a vector similar to the user may have searched or reviewed. Basing the vector on other people can be combined with expressed preferences and the like.

The N-dimensional vector comparison discussed herein differs from making comparisons based on numerical ranking values and provides for more customized results in comparison with a single numerical value. The N-dimensional vector computed can be referred to as a feature vector and can describe an area that the user would want to live. Categorical data can be included in the analysis, for example, does an area have good amenities, which can be weighted to give a number for each amenity. The weights will indicate the importance of the various amenities or characteristics to the user. Each vector can be described by a distance metric compared to a reference feature vector. The distance metric (e.g., a Euclidian distance) can be used to find locations within a threshold distance of the reference feature vector. The distance metric is not a physical distance (e.g., meters), but a vector distance associated with the similarity between the feature vectors. One of ordinary skill in the art would recognize many variations, modifications, and alternatives. As the weights on the various characteristics are changed, the reference feature vector changes in response, modifying the distance metrics for other vectors compared to the reference feature vector. The distance metric will relate to the distance in vector space from the reference feature vector, for example, neighborhoods within 5% of the reference feature vector.

The neighborhood analysis can include performing a cross-section of the houses in a neighborhood to obtain an approximate average of the value, average lot size, average garage size, average distance to the highway, and other factors to generate a profile of the user's current house and user's neighborhood.

A baseline feature vector can be computed for a metropolitan area and then a determination can be made of how each neighborhood's feature vector departs from the baseline feature vector. In this analysis, a suburb of a city would be compared to the metropolitan area as a whole to determine how the particular neighborhoods depart from the baseline associated with the metropolitan area. In finding a new home in the new city, the search could focus on finding a neighborhood in the new metropolitan area that departs from the baseline in a similar manner to the departure in the old metropolitan area.

Embodiments of the present invention can provide the user with a useful comparison between metropolitan areas. As an example, a neighborhood in the new metropolitan area could be matched to the user's current neighborhood. Then a house in the new neighborhood could be found that is the closest match to the user's current house. The system would show the price differential, among other factors, between the current house and the new house. A user interface could be provided that will show the user the changes in the characteristics as the price of the new home is adjusted. For example, as the target price range for the new house is raised, changes in the schools, traffic, and the like could be displayed in response to the increase in the target price range.

Some embodiments define the neighborhood based on a comparison of the characteristics that are most important to the user. As an example, a user could specify a five-bedroom house, with A+ schools, close to a bank, and close to their work. The system could generate one or more neighborhoods that matched the criteria within a predetermined threshold. A matching metric could indicate how closely the neighborhoods matched the criteria and guide the user in finding homes most closely matching their criteria.

According to some embodiments of the present invention, a comparison between a current home and a similar new home in a new city is provided, including a scaling between the current home and the new home. As an example, the scaling could indicate an increase in price for the new home in comparison with the current home, an increase in the price of insurance for the new home in comparison with the current home, and the like. In addition to comparisons between a new home and a user's current home, the user could specify the features desired in a current home and this notional home could be used as the baseline home. Thus, a current home can be ranked against a potential new home and housing attributes for the current home and the new home can be ranked in comparison manner.

According to an embodiment of the present invention, a Euclidian distance between a current home and a median home for the current city is computed. The distances for the various measures (number of bedrooms, quality of schools, etc.) are computed and then can be adjusted by the user. As an example, if a current home is 10 miles from an elementary school and the user wants a home that is 5 miles from the elementary school, the variable for distance to local school could be modified by the user to provide a search vector based on the current home, but tailored to the user's tastes. The attributes can be weighted based on user preferences to provide an index that combines the attributes and the weighting to rank homes in comparison with each other.

In order to obtain information about a user, embodiments of the system provide a free text entry interface that enables a user to enter free form text describing aspects that the user prefers in relation to former homes or interests. Based on the text entries, the system constructs a tag library of words that are significant for a new house, for example, close to the ocean, next to the highway, close to work, water, schools, low crime, shopping, theaters, and the like. A statistical model is then used in conjunction with the free form text to generate an initial search vector for a new home. Sentence analysis could be used to supplement the free text search. It is possible that inputs for the free text entry interface will be provided using history information for the user, social networks, and the like. The word-based inputs can be used in creating the feature vectors described more fully throughout the present specification.

According to some embodiments, information related to the user, for example, the user's current home, the user's current neighborhood, and the like are used to construct a feature vector for the user. Then the tags associated with the user are used to modify the feature vector and compute an updated feature vector that is based on current information as well as user input.

According to an alternative embodiment of the present invention, the neighborhood definition is provided by the user. In this alternative embodiment, the user will specify the geographic boundaries of an area that is defined as the user's neighborhood. In contrast with conventional neighborhood definitions based on realtor maps and the like, the user can define an arbitrary neighborhood based on their own geographical boundary definitions. The geographic boundary defined by the user will then be used to create a feature vector for the user defined neighborhood for use in determining similar neighborhoods in a new city. In an exemplary embodiment, data on the homes within the user-defined neighborhood is used to provide home attributes used in creating the feature vector.

Figure 5:
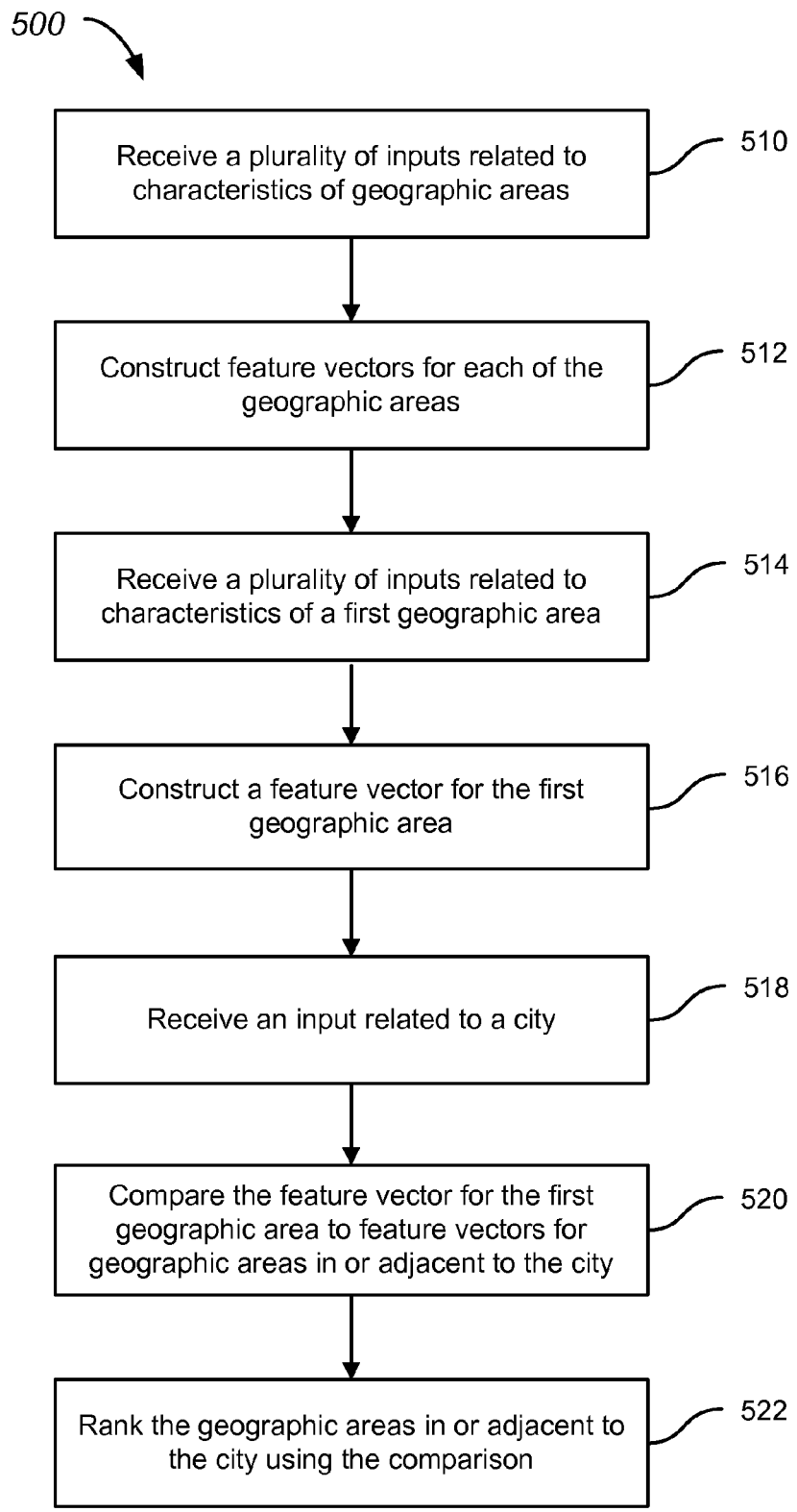
FIG. 5 is a high level flowchart illustrating a method of determining an area having similar characteristics to a first geographic area associated with a user according to an embodiment of the present invention.

FIG. 5 is a high level flowchart illustrating a method of determining an area having similar characteristics to a first geographic area associated with a user according to an embodiment of the present invention. The method 500 includes receiving a plurality of inputs related to characteristics of a plurality of geographic areas (510). The plurality of geographic areas can be associated with neighborhoods located in or adjacent to a city of interest and the characteristics can also be referred to as attributes, such as the quality of schools, access to public transportation, and the like. The method also includes constructing a feature vector for each of the plurality of geographic areas based on the plurality of inputs (512). The feature vector is an N-dimensional vector that characterizes the geographic area (e.g., a neighborhood) in a quantitative manner. The N-dimensional vector can be defined using N characteristics associated with the first geographic area. The method further includes receiving a plurality of inputs related to characteristics of the first geographic area (514) and constructing a feature vector for the first geographic area (516). In some embodiments, the feature vectors for the plurality of geographic areas and/or the feature vector for the first geographic area can be adjusted prior to a subsequent comparison step as described below.

Moreover, the method includes receiving an input from the user related to a city of interest (518), comparing the feature vector for the first geographic area to feature vectors associated with geographic areas located in or adjacent to the city of interest (520), and ranking the geographic areas located in or adjacent to the city of interest using the comparing step (522).

It should be appreciated that the specific steps illustrated in FIG. 5 provide a particular method of determining an area having similar characteristics to a first geographic area associated with a user according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
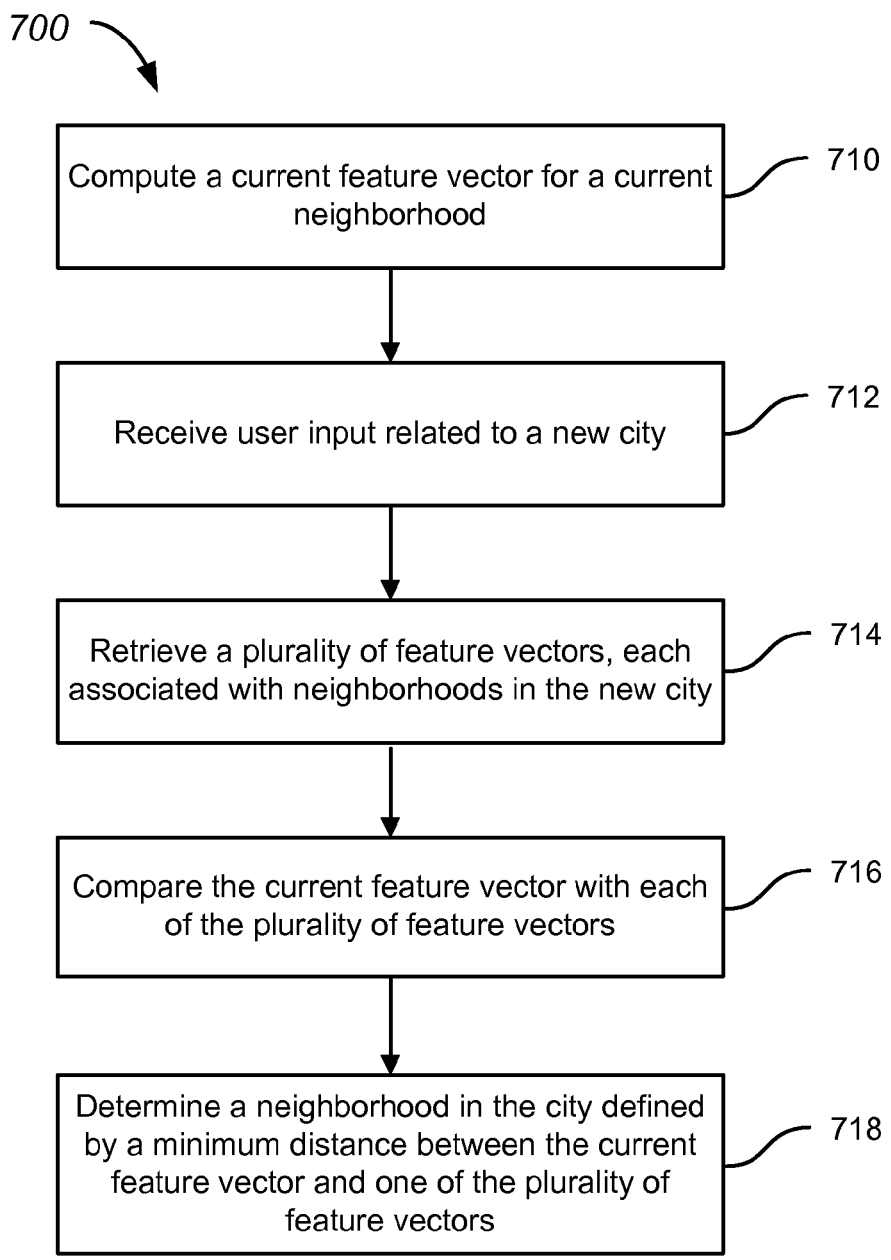
FIG. 7 is a high level flowchart illustrating a method of suggesting a new neighborhood to a user based on a current neighborhood according to an embodiment of the present invention.

FIG. 7 is a high level flowchart illustrating a method of suggesting a new neighborhood to a user based on a current neighborhood according to an embodiment of the present invention. The method 700 includes computing a current feature vector for the current neighborhood (710). The current feature vector is based on a plurality of characteristics of the current neighborhood. The method also includes receiving an input from the user related to a city of interest (712) and retrieving a plurality of feature vectors from a database storing feature vectors associated with neighborhoods in the city of interest (714). The method further includes comparing the current feature vector with each of the plurality of feature vectors (716) and determining a neighborhood in the city of interest defined by a minimum distance between the current feature vector and one of the plurality of feature vectors (718).

According to some embodiments, the method additionally includes ranking the neighborhoods in the city of interest by increasing distance between the feature vector for the current neighborhood and the plurality of feature vectors. Although the feature vectors for the neighborhoods are retrieved from a database in the embodiment illustrated in FIG. 7, this is not required by embodiments of the present invention. These feature vectors can be computed in real time based on the user's input related to the city of interest. One of ordinary skill in the art would recognize many variations, modifications, and alternatives.

It should be appreciated that the specific steps illustrated in FIG. 7 provide a particular method of suggesting a new neighborhood to a user based on a current neighborhood according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
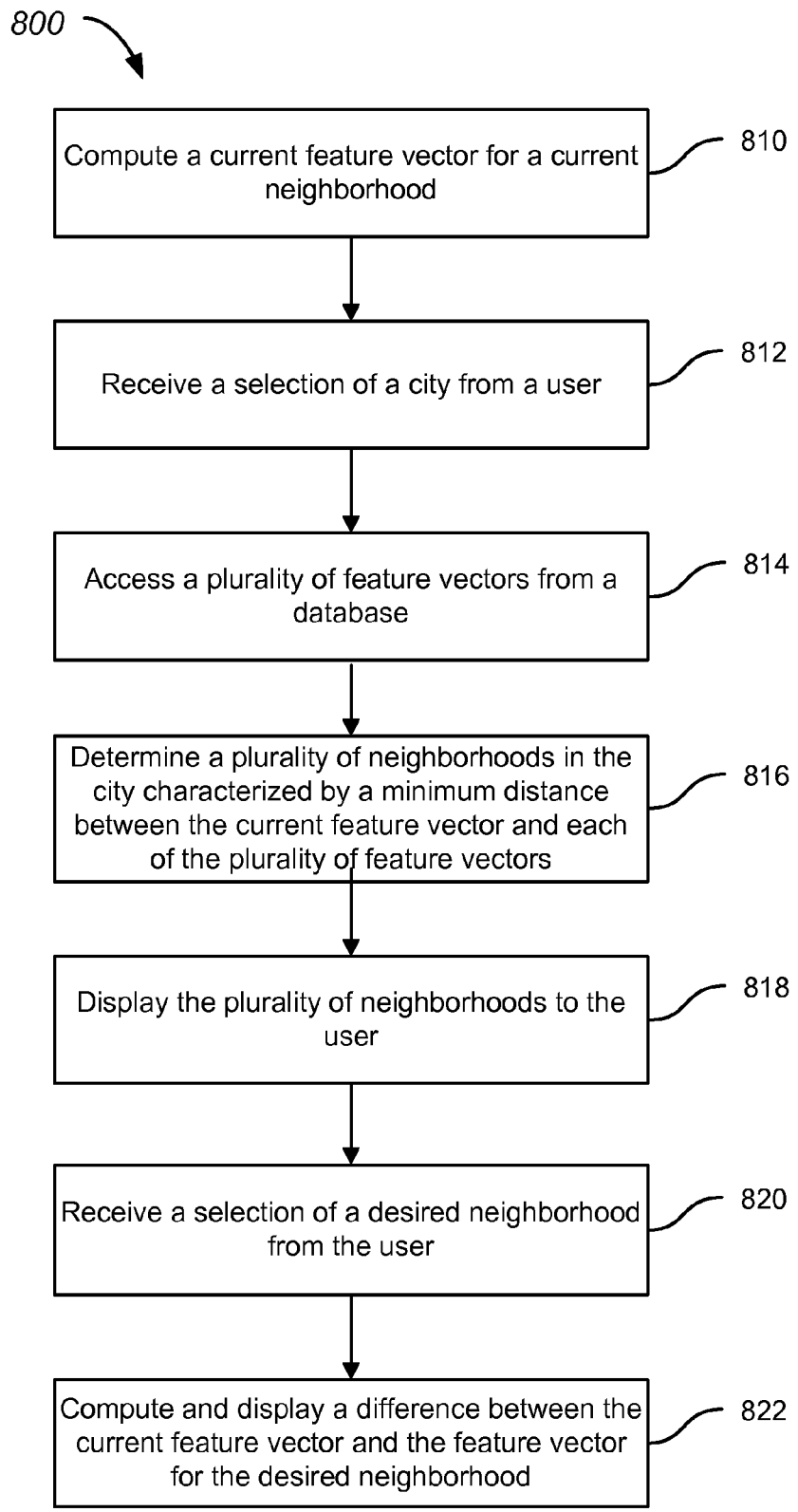
FIG. 8 is a high level flowchart illustrating a method of comparing a current neighborhood to a desired neighborhood in a city of interest according to an embodiment of the present invention.

FIG. 8 is a high level flowchart illustrating a method of comparing a current neighborhood to a desired neighborhood in a city of interest according to an embodiment of the present invention. The method 800 includes computing a current feature vector based on characteristics associated with the current neighborhood (810), receiving the selection of the city of interest from the user (812) and accessing a plurality of feature vectors from a database (814). The characteristics associated with the current neighborhood can include characteristics associated with the user, for example, income, age, number of children, and the like. The characteristics associated with the current neighborhood can also include characteristics associated with homes in the neighborhood, such as average value, square footage, and the like. Moreover, the characteristics associated with the current neighborhood can additionally include characteristics associated with neighborhood features, for example, number of trees per acre, proximity to a body of water, and the like. Each of the plurality of feature vectors is associated with one of the plurality of neighborhoods in the city of interest.

The method also includes determining a plurality of neighborhoods in the city of interest characterized by a minimum difference between the current feature vector and each of the plurality of feature vectors (816) and displaying the plurality of neighborhoods to the user (818). The method further includes receiving a selection of a desired neighborhood from the user (820), computing a difference between the current feature vector and the feature vector associated with the desired neighborhood (822) and displaying the difference to the user (824). Displaying the difference can include displaying a cost differential between a similar home in the current neighborhood and the desired neighborhood.

It should be appreciated that the specific steps illustrated in FIG. 8 provide a particular method of comparing a current neighborhood to a desired neighborhood in a city of interest according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
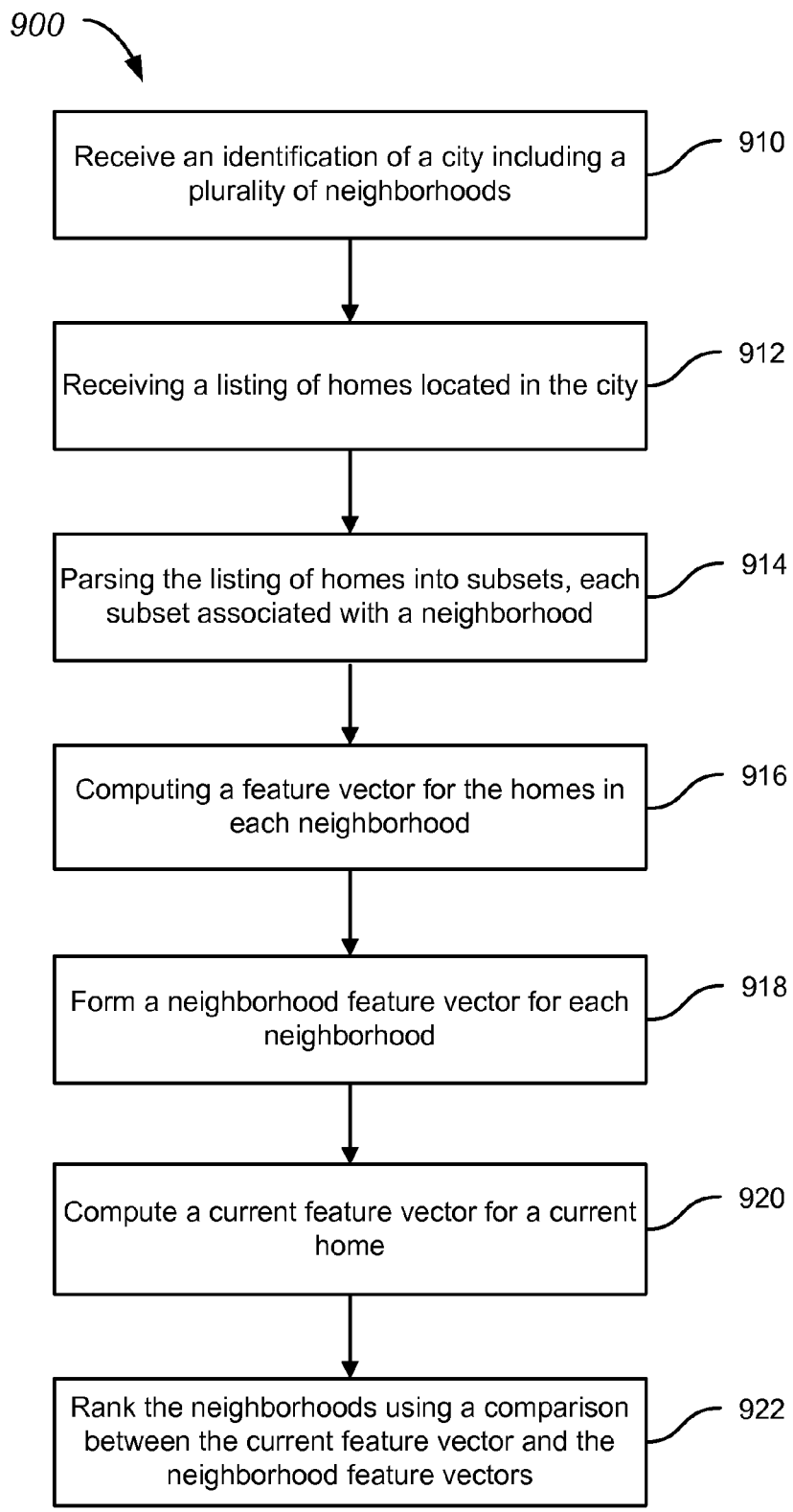
FIG. 9 is a high level flowchart illustrating a method of providing a user with a neighborhood ranking according to an embodiment of the present invention.

FIG. 9 is a high level flowchart illustrating a method of providing a user with a neighborhood ranking according to an embodiment of the present invention. The method includes receiving an identification of a city including a plurality of neighborhoods (910), receiving a listing of homes located in the city (912), and parsing the listings into subsets of listings (914). Each subset is associated with one neighborhood. The indication of the city can be received as an input from the user through a graphical user interface. The method also includes computing, using a processor, a feature vector for the homes in each subset of listings (916) and for each neighborhood, forming a neighborhood feature vector by combining the feature vectors for the homes in each subset of listings (918).

The method further includes computing a current feature vector associated with a current home of the user (920). In the illustrated embodiment, the current feature vector is an N-dimensional vector based on N attributes associated with the current home. The method additionally includes comparing the current feature vector with the neighborhood feature vectors for each neighborhood, and ranking the neighborhoods using the comparison (922). The current feature vector is a function of attributes associated with the current home. Additionally, the method includes providing the user with the ranking.

In some embodiments, the current feature vector is adjusted using user input prior to comparing the current feature vector with the neighborhood feature vectors for each neighborhood. Thus, the user can modify the feature vector, if, for example, the user wants a comparison based on a home larger than the user's current home. Other types of user input can be used to adjust the current feature vector prior to the comparison step. Certain characteristics of the current neighborhood (e.g., crime rate, school ranking, commute distance to work) may be more important to the user than other characteristics (e.g., a number of parks, distance to shopping centers, and the like). The user may provide input related to a weighting factor for each of characteristics associated with the current neighborhood prior to computing a current feature vector so that the feature vector properly reflects importance of various characteristics of the current neighborhood to the user.

It should be appreciated that the specific steps illustrated in FIG. 9 provide a particular method of providing a user with a neighborhood ranking according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
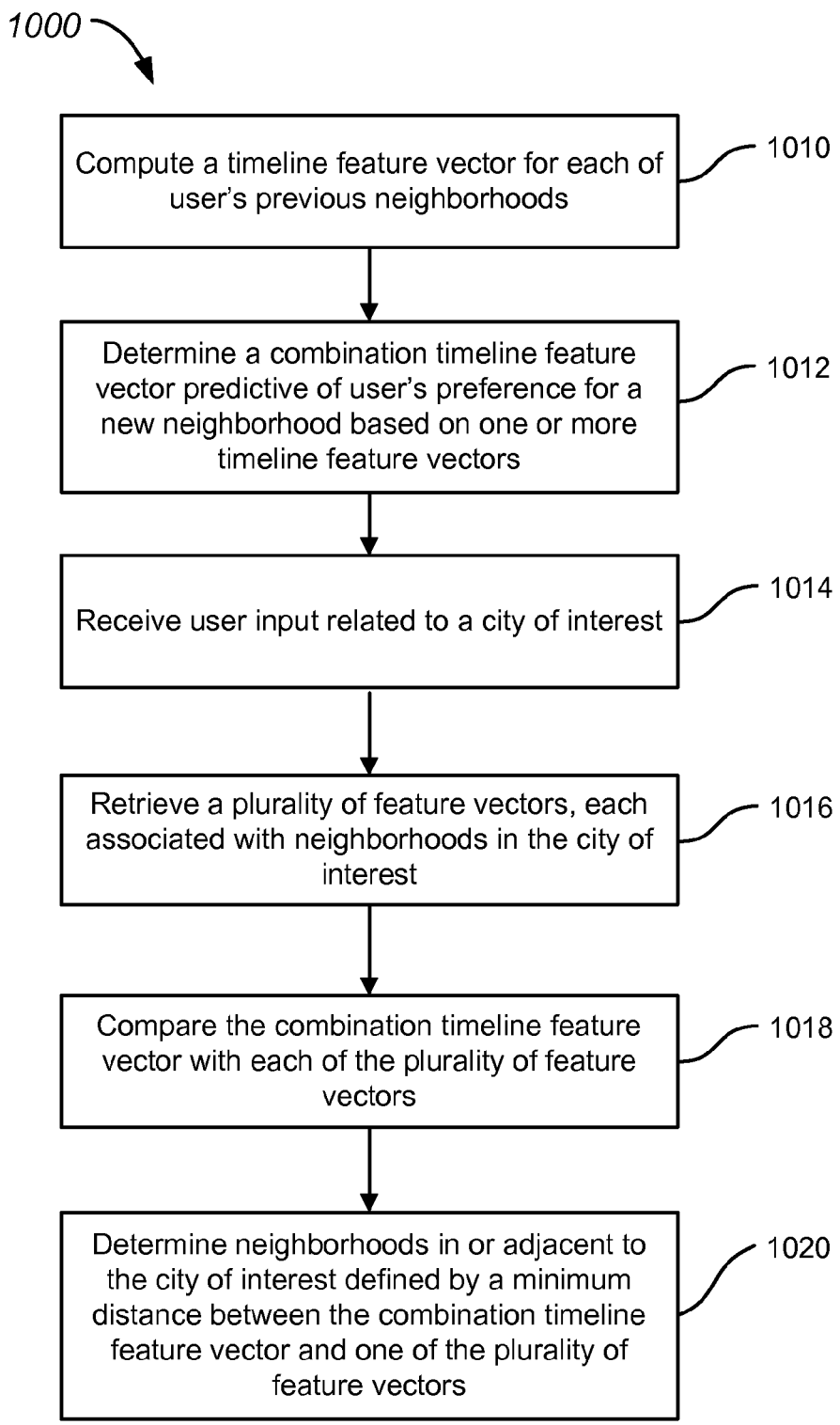
FIG. 10 is a high level flowchart illustrating a method of suggesting a new neighborhood to a user based information related to the user's previous neighborhoods according to an embodiment of the present invention.

FIG. 10 is a high level flowchart illustrating a method of suggesting a new neighborhood to a user using the user's previous neighborhoods according to an embodiment of the present invention (1000). The user's previous neighborhoods may include a neighborhood of the current home or neighborhoods of past homes in which the user has resided. The characteristics associated with each of the user's previous neighborhoods may reflect the user's preference for certain types of neighborhoods. Alternatively, changes in characteristics of previous neighborhoods over time may reflect a trend of the user's preference for certain types of homes or neighborhoods over time. In an embodiment, the user's previous neighborhood information can be obtained from the user using the user input module 240. Alternatively, the user's previous addresses stored in a database can be retrieved, and previous neighborhoods surround the previous addresses can be analyzed.

In determining the user's previous neighborhoods, the neighborhood boundary may be selected using any suitable methods. In some embodiments, the boundary of a previous neighborhood can be provided by the user. For example, a map of geographic areas surrounding the user's previous home may be displayed on a screen of the user's computing device. Using a mouse or other pointing device, the user may manually draw a boundary around a geographical area that the user regards as a previous neighborhood surrounding the user's previous home. The boundary may be of any suitable shape and may include one or more of non-contiguous areas. In other embodiments, the boundary of a previous neighborhood can be generated by a feature vector processor. As an example, the city in which the user's previous home is located may be divided into separate neighborhoods based on geographical features, clustering of homes, average home price, or the like. A processor generated boundary may be used to define boundaries around the user's previous neighborhoods.

As shown in FIG. 10, the method (1000) includes computing a timeline feature vector for each of the user's previous neighborhoods, each of the user's previous neighborhoods having a plurality of characteristics (1010). A timeline feature vector is calculated using the plurality of characteristics associated with each of the user's previous neighborhoods. The plurality of characteristics may include average home size, average home price, average lot size, crime rate, school district ratings, distance to highway, distance to parks, or the like. These characteristics can be represented as numerical feature values, from which a timeline feature vector can be constructed. Since characteristics of one neighborhood differ from those of another neighborhood, each of timeline feature vectors calculated from the previous neighborhoods is unique and different from one another.

The method (1000) also includes determining a combination timeline feature vector predictive of the user's preference for a new neighborhood using one or more of the timeline feature vectors (1012). In an embodiment, a combination timeline feature vector may be a weighted average of the one or more timeline feature vectors. The user may use a graphical user interface with options to rank the previous neighborhoods in which the user has lived according to the user's preference for each neighborhood. The ranking of the previous neighborhoods may be used to compute a relative preference, or a weighting factor, associated with each timeline feature vector for previous neighborhoods. From the weighted average of timeline feature vectors, a combination timeline feature vector can be determined. Additionally or alternatively, the user may be provided with an option to describe, in free text mode, positive or negative experience living in each of the previous neighborhoods. The free text input provided by the user may be analyzed by a processor to determine a relative preference of the previous neighborhoods by the user. The relative preference based on the user's free text input may be used to as an weighting factor in determining a combination timeline feature vector. In other embodiments, a weighting factor may be determined by a data processor, without the user input, based on a trend of the user's previous neighborhoods over time.

The method (1000) further includes receiving an input from the user related to a city of interest (1014), and retrieving a plurality of feature vectors associated with neighborhoods located in or adjacent to the city of interest (1016). In an embodiment, a plurality of feature vectors located only in the city of interest may be retrieved. In another embodiment, if the city of interest is a part of a larger metropolitan area, neighborhoods located in the city of interest as well as neighborhoods adjacent to the city of interest may be retrieved from a database. As an example, if the user's input indicates that the user is interested in moving to Washington, D.C., a plurality of feature vectors associated with neighborhoods in D.C. as well as with neighborhoods in Maryland or Virginia bordering D.C. may be retrieved. A boundary of geographic areas in or adjacent to the city of interest for analysis may be determined by several factors, such as the user's preference for commute distance, the user's financial data, preferred features of a neighborhood, or the like.

The method (1000) further includes comparing the combination timeline feature vector with each of the plurality of feature vectors associated with the neighborhoods in or adjacent to the city of interest (1018). After comparison, the method also includes determining one or more of the neighborhoods in or adjacent to the city of interest characterized by a minimum distance between the combination timeline feature vector and one of the plurality of feature vectors for new neighborhoods (1020). A minimum distance between the combination timeline feature vector and a feature vector associated with a new neighborhood indicates that the new neighborhood has characteristics which most resemble those preferred characteristics of the user's previous neighborhoods.

In an embodiment of the invention, the method may further include ranking one or more of the neighborhoods in or adjacent to the city of interest by increasing distance between the combination feature vector and the plurality of feature vectors associated with new neighborhoods. The ranking of the new neighborhoods may be displayed on a screen of the user's computing device. In addition to displaying ranking, the description or reviews of each neighborhood by people who are familiar with the neighborhood may be displayed next to the ranking. For example, if a neighborhood in the new city has neighborhood characteristics defined by the cloud reviews by the people who actually live in the neighborhood, the reviews may be provided as a link on a display screen next to the ranking so that the user can view subjective comments regarding the neighborhood.

After reviewing the best matched neighborhoods in or adjacent to the new city, the user may select a new neighborhood to obtain additional information related to the new neighborhood. After receiving the user selection of a desired neighborhood, a neighborhood ranking system (200) in accordance with an embodiment of the present invention may compute a difference between at least one of the timeline feature vectors of the previous neighborhoods and the feature vector associated with a new neighborhood selected by the user. The difference (or similarities) between the previous neighborhood and the new neighborhood may be displayed for the user to review. For example, the difference may include a cost differential between a similar home in the selected new neighborhood and at least one of the user's previous neighborhoods. The other differences such as school ranking, property tax rate, demographics, or the like, may also be displayed for the user's review.

After the user selects a neighborhood in or adjacent to the city of interest, the user may be presented with an option to view homes available for sale or for rent in the selected neighborhood. In embodiments of the present invention, the search results of homes may be combined with the user's financial state (e.g., using the PFM software), and the user's affordability of each home may be calculated in view of the user's current or projected future financial state. The calculation may include the total cost of home ownership, such as mortgage payment, home insurance and other hazard insurance, property tax, general maintenance cost, and the like.

It should be appreciated that the specific steps illustrated in FIG. 10 provide a particular method of suggesting a new neighborhood according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in in various sequences as appropriate to the individual step. Furthermore, additional steps may be added or removed depending on the particular applications. One of ordinary skill in the art would recognize many variations, modifications, and alternatives.

Figure 11:
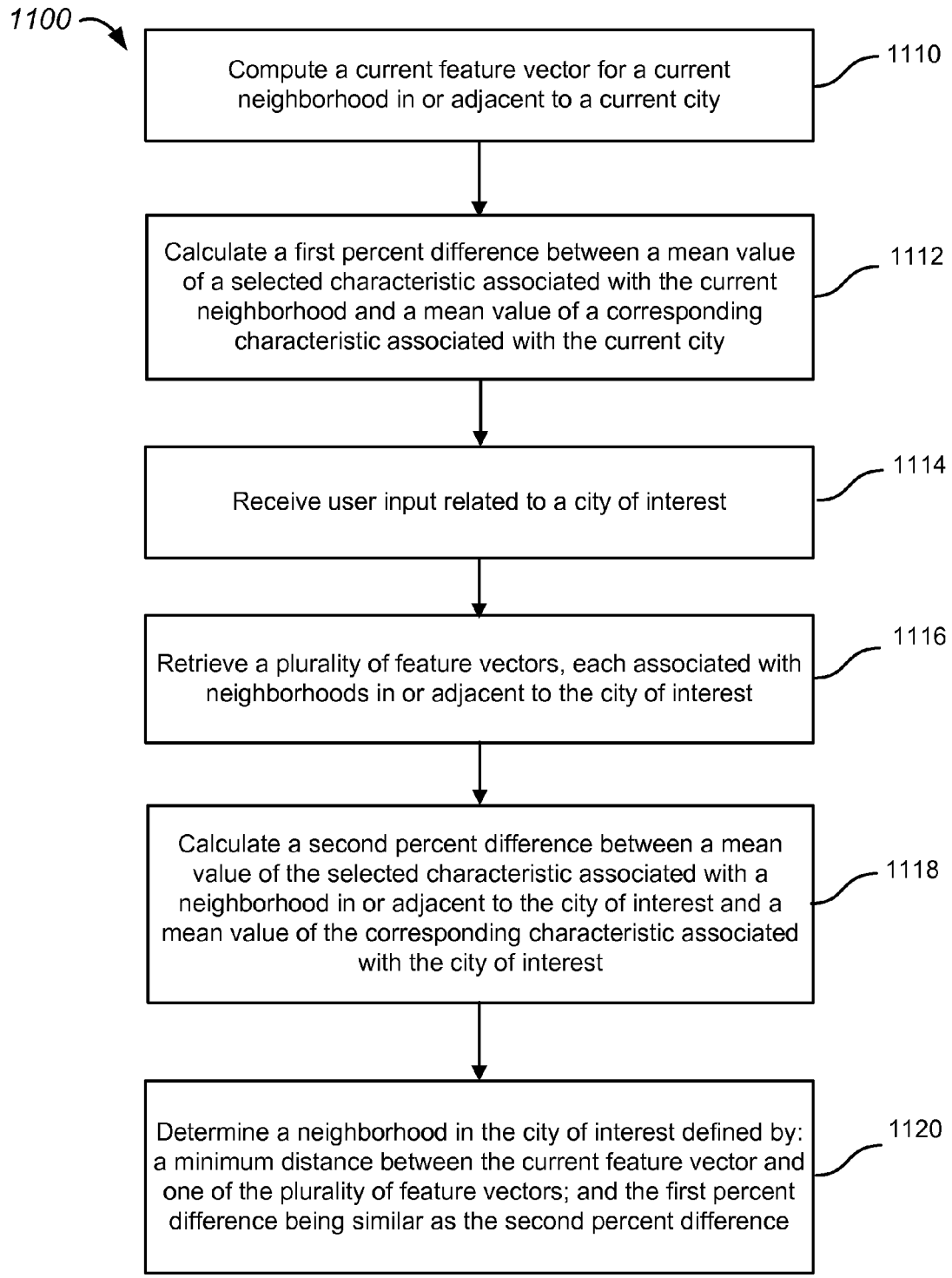
FIG. 11 is a high level flowchart illustrating a method of suggesting a new neighborhood that has the same or similar classification of a selected characteristic as the user's current neighborhood according to an embodiment of the present invention.

FIG. 11 is a high level flowchart illustrating a method of suggesting a new neighborhood in a new geographic area based classification of the user's current neighborhood relative to the current city according to an embodiment of the present invention. Typically, each city contains a number of different neighborhoods or subdivisions located in or adjacent to the city, where each neighborhood has distinct characteristics. In embodiments of the present invention, new neighborhoods in the new city with the same or similar classification as the current neighborhood may be presented to the user. As an example, if the user is moving from a low cost area to a high cost area and if the user is currently living in a neighborhood with a mean home value of about 10 percent above the median, then the user may be presented with new neighborhoods ranging from 5 to 20 percent above the median for the new geographic area.

In embodiments of the present invention, one of the search criteria for a new neighborhood in or adjacent to a city of interest may include a classification of one or more characteristics of a current neighborhood relative to the current city. As an example, if the user would like to find a neighborhood with a mean home value which is about 50 percent over a mean home value of all the neighborhoods combined in the city, then such a criterion may be included during a feature vector analysis. As an illustration, let say a user currently lives in a city with a mean home value of $500,000, whereas his immediate neighborhood within the city has a mean home value of $750,000 (i.e., about 50% greater). When the user searches for a neighborhood in a new city with a mean home value of about $200,000, the user may desire to live in a similarly upscale new neighborhood with a mean home value of about $300,000 (i.e., about 50% greater). While a mean home value is used as an illustration, any suitable characteristics (e.g., school ranking, distance to freeway, or the like) of a neighborhood relative to corresponding characteristics of a new city may be used as one of the search criteria for a new neighborhood.

As shown in FIG. 11, the method (1100) includes computing a current feature vector using characteristics associated with a current neighborhood within a current city (1110). As described above, a number of different characteristics of a neighborhood (e.g., average home price, average home size, lot size, distance to school, school rank, or the like) can be represented as an N-dimensional vector of numerical features. The method also includes calculating a first percent difference between a mean value of a selected characteristic associated with the current neighborhood and a mean value of a corresponding selected characteristic associated with the current city (1112). In other words, the first percent difference represents a spread of a selected characteristic associated with the current neighborhood compared to the median. As described above, a selected characteristic may be any characteristic associated with a neighborhood, such as a mean home value, school ranking, distance to elementary schools, crime rate, or the like.

The method (1100) also includes receiving an input from the user related to city of interest (1114), and retrieving a plurality of feature vectors associated with neighborhoods in or adjacent to the city of interest (1116). The method further includes calculating a second percent difference between a mean value of the selected characteristic associated with each of the neighborhoods in or adjacent to the city of interest and a mean value of the corresponding selected characteristic associated with the city of interest (1118). The second percent difference represents a spread of a selected characteristic associated with a new neighborhood compared to the median (e.g., a mean value of a corresponding characteristic of the new city).

The method (1100) further includes determining one or more neighborhoods in or adjacent to the city of interest characterized by: (1) a minimum difference between the current feature vector and each of the plurality of feature vectors; and (2) the first percent difference being similar to the second percent difference (1120). A threshold for similarity between the first percent difference and the second percent difference can be pre-set at a predetermined level (e.g., within 1, 5, 10, 20, 30 percent, or the like). A minimum distance between the current feature vector and a feature vector associated with a new neighborhood indicates that the new neighborhood has characteristics which are most similar to those of the user's current neighborhood. When the first percent difference and the second percent difference are similar, it indicates that a new neighborhood with the same classification for a selected characteristic (as the current neighborhood) will be presented to the user.

In embodiments shown in FIG. 11, while a selected characteristic of a neighborhood relative to the corresponding characteristic of a city is expressed as a separate component in the determining step, the percent difference of the selected characteristic may be incorporated as a part of a feature vector for the neighborhood. In other words, the classification of a selected characteristic such as a mean home value of a neighborhood compared to the median may be represented as numerical feature in a feature vector, along with school ranking, crime rate, distance to freeways, or the like.

It should be appreciated that the specific steps illustrated in FIG. 11 provide a particular method of suggesting a new neighborhood according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in in various sequences as appropriate to the individual step. Furthermore, additional steps may be added or removed depending on the particular applications. One of ordinary skill in the art would recognize many variations, modifications, and alternatives.

The methods described herein can be implemented by a processor coupled to a non-transitory computer readable storage media as described more fully below.

Figure 6:
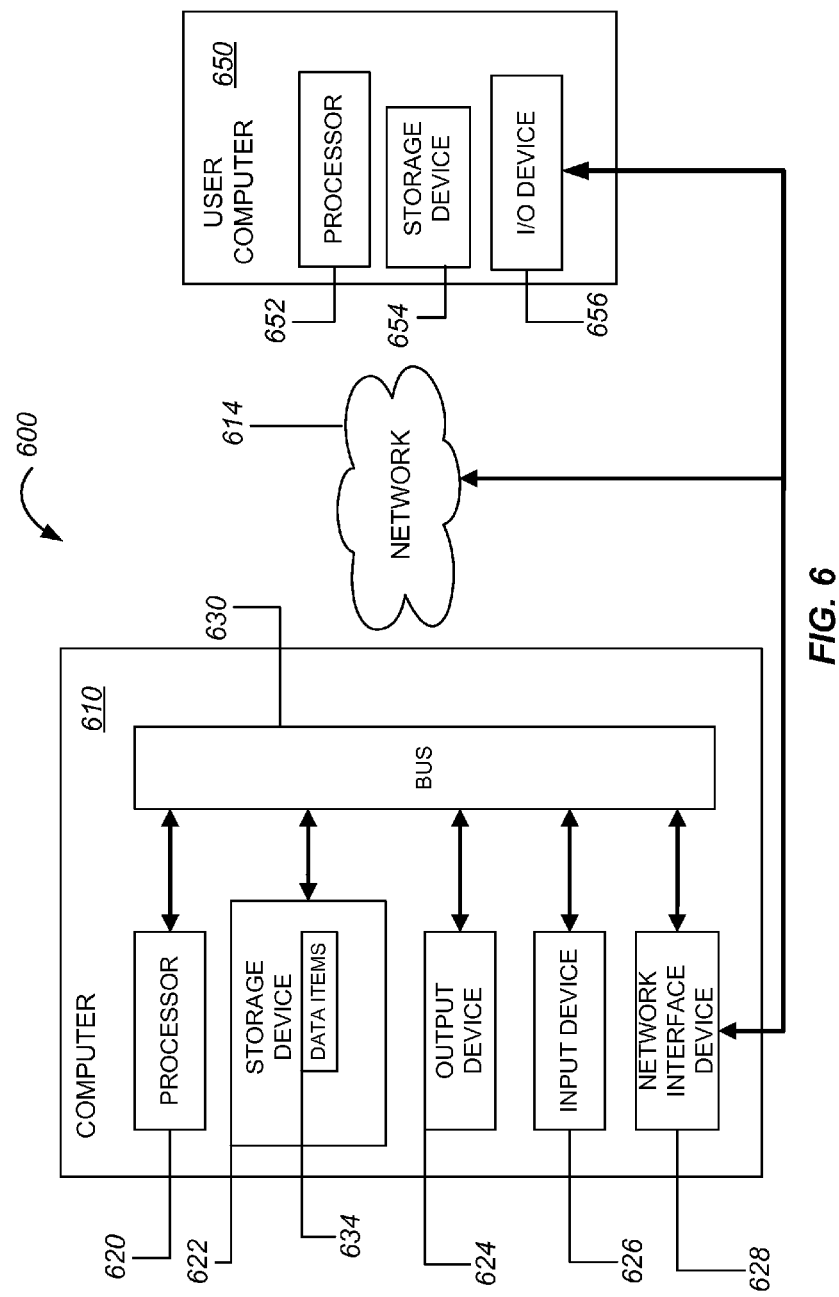
FIG. 6 is high level schematic diagram illustrating a computer system including instructions to perform any one or more of the methodologies described herein.

FIG. 6 is high level schematic diagram illustrating a computer system including instructions to perform any one or more of the methodologies described herein. A system 600 includes a computer 610 connected to a network 614. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 614 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 614.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 614 through any suitable communications protocol. The network interface device 628 sends and receives data items from the network 614.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 614 may be any suitable network and may support any appropriate protocol suitable for communication to the computer 610. In an embodiment, the network 614 may support wireless communications. In another embodiment, the network 614 may support hard-wired communications, such as a telephone line or cable. In another embodiment, the network 614 may support the Ethernet IEEE (Institute of Electrical and Electronics Engineers) 802.3x specification. In another embodiment, the network 614 may be the Internet and may support IP (Internet Protocol). In another embodiment, the network 614 may be a local area network (LAN) or a wide area network (WAN). In another embodiment, the network 614 may be a hotspot service provider network. In another embodiment, the network 614 may be an intranet. In another embodiment, the network 614 may be a GPRS (General Packet Radio Service) network. In another embodiment, the network 614 may be any appropriate cellular data network or cell-based radio network technology. In another embodiment, the network 614 may be an IEEE 802.11 wireless network. In still another embodiment, the network 614 may be any suitable network or combination of networks. Although one network 614 is shown, in other embodiments any number of networks (of the same or different types) may be present.

A user computer 650 can interact with computer 610 through network 614. The user computer 650 includes a processor 652, a storage device 654, and an input/output device 656. The description related to processor 620 and storage device 622 is applicable to processor 652 and storage device 654. As an example, the user computer 650 can be a personal computer, laptop computer, or the like, operated by a member of a membership organization (e.g., an insurance company, a financial institution, a real estate company, or the like). Using the user computer 650, the member can then interact with computer 610 operated by such an organization, such as the present assignee, through network 614 in order to access the organization web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of suggesting a new neighborhood to a user using information related to the user's previous neighborhoods, the method comprising:
   computing a timeline feature vector for each of the user's previous neighborhoods, each of the user's previous neighborhoods having a plurality of characteristics associated therewith, wherein the timeline feature vector is calculated using the plurality of characteristics associated with each of the user's previous neighborhoods;
   determining a combination timeline feature vector using one or more of the timeline feature vectors, wherein the combination timeline feature vector is predictive of the user's preference for the new neighborhood using the information related to the user's previous neighborhoods;
   receiving an input from the user related to a city of interest;
   retrieving a plurality of feature vectors from a database storing feature vectors associated with neighborhoods located in or adjacent to the city of interest;
   comparing the combination timeline feature vector with each of the plurality of feature vectors; and
   determining one or more of the neighborhoods located in or adjacent to the city of interest defined by a minimum distance between the combination timeline feature vector and one of the plurality of feature vectors.

2. The method of claim 1 further comprising adjusting the combination timeline feature vector using user input prior to comparing the combination timeline feature vector with the plurality of feature vectors.

3. The method of claim 1 further comprising prioritizing the user's previous neighborhoods using the user's preference and weighing the one or more timeline feature vectors according to the user's preference in calculating the combination timeline feature vector.

4. The method of claim 1 further comprising ranking the one or more neighborhoods located in or adjacent to the city of interest by increasing distance between the combination timeline feature vector and the plurality of feature vectors.

5. The method of claim 1 further comprising:
   displaying the one or more of the neighborhoods located in or adjacent to the city of interest to the user;
   receiving a selection, from the user, of a desired neighborhood having a desired feature vector from the one or more of the neighborhoods located in or adjacent to the city of interest;

computing a difference between at least one of the timeline feature vectors of the previous neighborhoods and the desired feature vector associated with the desired neighborhood; and displaying the difference to the user.

6. The method of claim 5 wherein displaying the difference comprises displaying a cost differential between a similar home in the selected desired neighborhood and at least one of the user's previous neighborhoods.

7. The method of claim 2 wherein the user input includes defining a boundary for each of the user's previous neighborhoods prior to computing the timeline feature vector for the each of the user's previous neighborhoods.

8. A method of suggesting a new neighborhood to a user, the method comprising:

computing a current feature vector for a current neighborhood in or adjacent to a current city, wherein the current feature vector is calculated using a plurality of characteristics of the current neighborhood and wherein the current neighborhood has a selected characteristic and the current city has a corresponding selected characteristic;

calculating a first percent difference between a mean value of the selected characteristic associated the current neighborhood and a mean value of the corresponding selected characteristic associated with the current city;

receiving an input from the user related to a city of interest;

retrieving a plurality of feature vectors from a database storing feature vectors associated with neighborhoods located in or adjacent to the city of interest, wherein each of the neighborhoods has the selected characteristic and the city of interest has the corresponding selected characteristic;

comparing the current feature vector with each of the plurality of feature vectors;

calculating a second percent difference between a mean value of the selected characteristic associated each of the neighborhoods located in or adjacent to the city of interest and a mean value of the corresponding selected characteristic associated with the city of interest; and determining one or more of the neighborhoods located in or adjacent to the city of interest characterized by:
a minimum difference between the current feature vector and each of the plurality of feature vectors; and
the first percent difference being similar to the second percent difference.

9. The method of claim 8 wherein the selected characteristic is a home price.

10. The method of claim 8 wherein the selected characteristic is a school ranking or a crime rate.

11. The method of claim 8 further comprising adjusting the current feature vector using user input prior to comparing the current feature vector with the plurality of feature vectors.

12. The method of claim 11 wherein the user input includes defining a boundary for the current neighborhood prior to computing the current feature vector.

13. The method of claim 8 further comprising:
displaying the one or more of the neighborhoods located in or adjacent to the city of interest to the user;
receiving a selection, from the user, of a desired neighborhoods having a desired feature vector from the one or more of the neighborhoods in or adjacent to the city of interest;
computing a difference between the current feature vector and the desired feature vector associated with the selected desired neighborhood; and
displaying the difference to the user.

14. The method of claim 13 wherein displaying the difference comprises displaying a cost differential between a similar home in the current neighborhood and the desired neighborhood.

* * * * *